US011271906B2

(12) United States Patent
Kim et al.

(10) Patent No.: US 11,271,906 B2
(45) Date of Patent: Mar. 8, 2022

(54) SYSTEM AND METHOD FOR FORWARDING TRAFFIC OF ENDPOINT

(71) Applicant: SOMANSA CO., LTD., Seoul (KR)

(72) Inventors: Tae Wan Kim, Seoul (KR); Il Hoon Choi, Seoul (KR)

(73) Assignee: SOMANSA CO., LTD., Seoul (KR)

( * ) Notice: Subject to any disclaimer, the term of this patent is extended or adjusted under 35 U.S.C. 154(b) by 183 days.

(21) Appl. No.: 16/666,908

(22) Filed: Oct. 29, 2019

(65) Prior Publication Data
US 2021/0119972 A1    Apr. 22, 2021

(30) Foreign Application Priority Data

Oct. 16, 2019   (KR) .......................... 10-2019-0128326

(51) Int. Cl.
*G06F 13/00*     (2006.01)
*H04L 29/06*    (2006.01)
*H04L 67/02*    (2022.01)
*H04L 67/563*   (2022.01)

(52) U.S. Cl.
CPC ........ *H04L 63/0281* (2013.01); *H04L 63/029* (2013.01); *H04L 63/0272* (2013.01); *H04L 63/0428* (2013.01); *H04L 63/08* (2013.01); *H04L 63/166* (2013.01); *H04L 67/02* (2013.01); *H04L 67/2814* (2013.01)

(58) Field of Classification Search
CPC ............... H04L 63/0281; H04L 63/166; H04L 63/0272; H04L 63/029; H04L 67/02; H04L 67/2814; H04L 63/08; H04L 63/0428; H04L 63/12; H04L 63/0227; H04L 69/22; H04L 67/289; H04L 69/162; H04L 63/18; H04L 47/2475

USPC ....... 709/238, 239, 237, 231, 227–229, 203; 726/12, 11, 3, 4
See application file for complete search history.

(56) References Cited

U.S. PATENT DOCUMENTS

| | | | |
|---|---|---|---|
| 7,657,940 B2 * | 2/2010 | Portolani | H04L 63/0254 726/23 |
| 8,510,469 B2 * | 8/2013 | Portolani | H04L 43/0864 709/239 |
| 10,728,245 B2 * | 7/2020 | Kiester | H04L 9/3213 |
| 10,728,246 B2 * | 7/2020 | Bansal | H04L 67/2819 |

(Continued)

FOREIGN PATENT DOCUMENTS

KR   10-2010-0018022 A   2/2010

*Primary Examiner* — Kenneth R Coulter
(74) *Attorney, Agent, or Firm* — Harness, Dickey & Pierce, P.L.C.

(57) ABSTRACT

Disclosed is a system for forwarding traffic of an endpoint. The system includes the endpoint configured to transmit traffic generated by an application to a server and a security gateway configured to receive the traffic from the endpoint and analyzes data related to information security of secure sockets layer (SSL) traffic among the traffic. Here, the endpoint includes a local redirection module configured to store redirection information including server connection information for transmitting the traffic to the server and to perform redirection related to transmission of the traffic and a local proxy module configured to decode the data with respect to the SSL traffic among the traffic received from the local redirection module and then to forward the decoded SSL traffic to the security gateway according to the redirection of the local redirection module.

13 Claims, 4 Drawing Sheets

(56) References Cited

U.S. PATENT DOCUMENTS

| | | | |
|---|---|---|---|
| 2005/0262357 A1* | 11/2005 | Araujo | H04L 63/0272 |
| | | | 713/182 |
| 2005/0273849 A1* | 12/2005 | Araujo | H04L 63/0428 |
| | | | 726/12 |
| 2006/0095969 A1* | 5/2006 | Portolani | H04L 67/1002 |
| | | | 726/23 |
| 2010/0138910 A1* | 6/2010 | Aldor | H04L 63/0236 |
| | | | 726/14 |
| 2011/0055470 A1* | 3/2011 | Portolani | H04L 43/106 |
| | | | 711/108 |
| 2018/0255060 A1* | 9/2018 | Bansal | H04L 67/10 |
| 2019/0182250 A1* | 6/2019 | Kiester | H04L 63/0428 |
| 2020/0314121 A1* | 10/2020 | Mittermaier | H04L 67/10 |
| 2021/0105275 A1* | 4/2021 | Bansal | H04L 61/1511 |

\* cited by examiner

SYSTEM AND METHOD FOR FORWARDING TRAFFIC OF ENDPOINT

CROSS-REFERENCE TO RELATED APPLICATION

This application claims priority to and the benefit of Korean Patent Application No. 2019-0128326, filed on Oct. 16, 2019, the disclosure of which is incorporated herein by reference in its entirety.

FIELD

The present invention relates to a system and a method of forwarding traffic from an endpoint to a cloud to provide a cloud-based information leakage prevention solution.

BACKGROUND

A security gateway of a network information leakage prevention solution relays network traffic using a proxy method, analyzes secure sockets layer (SSL) interception and protocol, and inspects whether personal information and confidential information are included in data transmitted over the Internet such as a mail, a message, a file, and the like. A security gateway in an on-premise environment is located between an inside network and the Internet and may include one of a snipping method of monitoring a packet using a Switch Port Analyzer (SPAN) or a TESS Access Point (TAP), an explicit proxy method of setting HTTP proxy in a browser and the like as a security gateway, a transparent inline proxy method of physically switching over a network, a port redirection method using an L4 switch or a firewall, and the like. A cloud-based security gateway which is not located inside may include the explicit proxy method of setting HTTP proxy in a browser and the like as a security gateway, a generic routing encapsulation (GRE) or Internet Protocol Security (IPsec) tunneling method of forwarding inside-Internet traffic to a security gateway using a firewall or router, and a general endpoint traffic forwarding method of transmitting traffic of an endpoint to a security gateway.

In the case of the explicit proxy method, HTTP proxy settings of browsers such as Internet Explorer, Chrome, Safari, Firefox, and the like are used such that there is a limitation incapable of forwarding traffic of an application such as a messenger and the like in addition to browsers to a gateway. In the case of the snipping method, the transparent inline proxy method, the port redirection method, or the GRE or proxy method, since physical equipment or components are necessary in an inside network, there is a limitation incapable of forwarding traffic of an endpoint in an outside network environment to a security gateway using a laptop PC and the like. In the case of the general endpoint traffic forwarding method, since traffic of an endpoint is transmitted and received over the Internet through a relay of a security gateway located on a cloud, an excessive Internet delay occurs and excessive network charge occurs due to use of a cloud network.

RELATED ART DOCUMENT

Patent Document (Patent Document 0001) Korean Patent Publication No. 10-2010-0018022 (published on Feb. 16, 2010)

SUMMARY

The present invention is directed to providing a method of forwarding Non-secure sockets layer (SSL) traffic and decoded SSL traffic to a cloud by using an out-of-path method by redirecting Internet connection between an endpoint and an application such as a browser with local proxy so as to inspect whether personal information and confidential information are included in traffic (data) transmitted over the Internet such as a mail, message, file, and the like.

According to an aspect of the present invention, there is provided a system for forwarding traffic of an endpoint. The system includes the endpoint configured to transmit traffic generated by an application to a server and a security gateway configured to receive the traffic from the endpoint and analyzes data related to information security of SSL traffic among the traffic. Here, the endpoint includes a local redirection module configured to store redirection information including server connection information for transmitting the traffic to the server and to perform redirection related to transmission of the traffic and a local proxy module configured to decode the data with respect to the SSL traffic among the traffic received from the local redirection module and then to forward the decoded SSL traffic to the security gateway according to the redirection of the local redirection module.

The local redirection module may perform the redirection with respect to the traffic by using at least one of a network-kernel-based connection redirection method and an application-socket-connection application program interface (API) hooking method.

The local redirection module may store, as the redirection information, server IP address information and port information with respect to the server and application IP address information and port information with respect to the application.

The local proxy module may be connected to the local redirection module by the redirection of the local redirection module, may refer to the redirection information stored in the local redirection module, and may perform transmission control protocol (TCP) connection with the server by using the server IP address information and port information included in the redirection information according to the reference.

The local proxy module may re-encode the decoded SSL traffic and may transmit the re-encoded SSL traffic to the server.

The local proxy module may add an Ethernet header, an IP header, and a TCP header to Non-SSL traffic, which is not the SSL traffic among the traffic, or payload data of the decoded SSL traffic and may forward the same to the security gateway.

The security gateway may perform a data validation procedure related to personal information and confidential information on the traffic forwarded from the local proxy module and may transmit inspection result information according to the data validation procedure to the local proxy module.

According to another aspect of the present invention, there is provided a method of forwarding traffic of an endpoint. The method includes storing, by a local redirection module included in the endpoint, redirection including server connection information for transmitting traffic generated by an application to a server, performing, by the local redirection module, redirection related to transmission of the traffic, decoding, by a local proxy module included in the endpoint, data with respect to SSL traffic among the received traffic according to the redirection of the local redirection module, and forwarding, by the local proxy module, the decoded SSL traffic to a security gateway.

The storing of the redirection information may include storing server IP address information and port information with respect to the server and application IP address information and port information with respect to the application as the redirection information.

The performing of redirection may include performing the redirection with respect to the traffic by using at least one of a network-kernel-based connection redirection method and an application-socket-connection API hooking method.

The method may include referring to, by the local proxy module connected to the local redirection module by the redirection of the local redirection module, the redirection information stored in the local redirection module and performing, by the local proxy module, TCP connection with the server by using the server IP address information and port information included in the redirection information according to the reference.

The method may further include re-encoding, by the local proxy module, the decoded SSL traffic and transmitting, by the local proxy module, the re-encoded SSL traffic to the server.

The method may further include adding, by the local proxy module, an Ethernet header, an IP header, and a TCP header to Non-SSL traffic, which is not the SSL traffic among the traffic, or payload data of the decoded SSL traffic and forwarding, by the local proxy module, the same to the security gateway.

The system may further include performing, by the security gateway, a data validation procedure related to personal information and confidential information on the traffic forwarded from the local proxy module and transmitting, by the security gateway, inspection result information according to the data validation procedure to the local proxy module.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Embodiments of the present invention are provided to more completely explain the present invention to one of ordinary skill in the art. The embodiments of the present invention may be changed in a variety of shapes, and the scope of the present invention should not be understood as being limited to the following embodiments. The embodiments are provided to allow the present disclosure to be more substantial and to completely transfer the concept of the present invention to those skilled in the art.

The terms used herein are used to explain particular embodiments and not intended to limit the present invention. As used herein, singular expressions, unless clearly defined otherwise in context, include plural expressions. Also, as used herein, the term "and/or" includes any and all combinations of one or a plurality of associated listed items.

Hereinafter, the embodiments of the present invention will be described with reference drawings which schematically illustrate the embodiments of the present invention.

Figure 1:
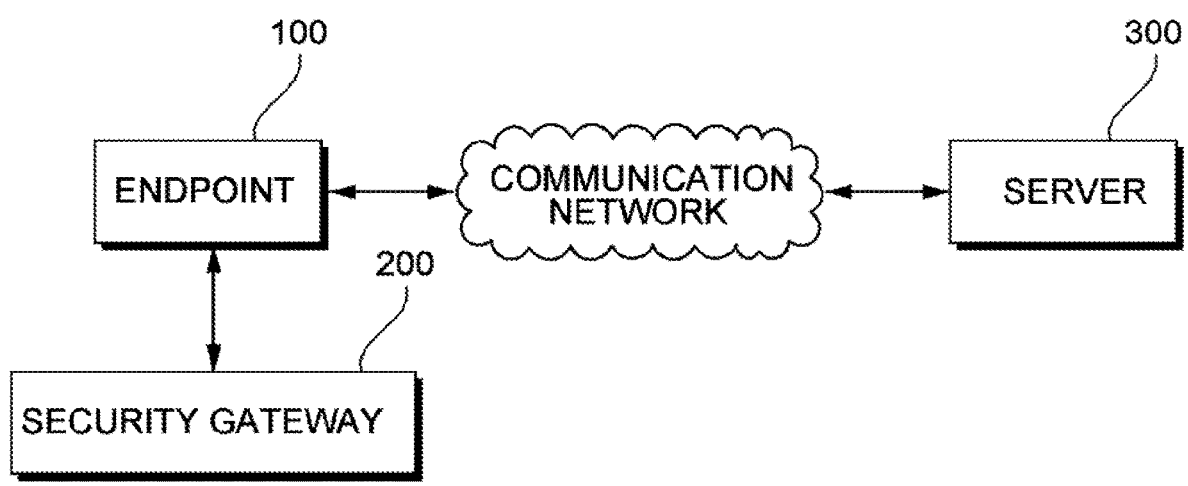
FIG. 1 is a configuration block diagram of a forwarding system with respect to traffic of an endpoint according to the present invention.

FIG. 1 is a configuration block diagram of a forwarding system with respect to traffic of an endpoint according to the present invention.

Referring to FIG. 1, the forwarding system with respect to traffic of an endpoint may include an endpoint 100 and a security gateway 200 and additionally include a server 300 as a component related thereto.

The endpoint 100 is a terminal which transmits traffic to the server 300 through a communication network generated in an application. The application may mean a program which generates traffic and may include programs for generating a mail, message, file, and the like. The communication network forms a network for transmitting and receiving data between the endpoint 100 and the server 300. The communication network may include a local area network (LAN), a wide are network (WAN), or wired Internet and may include wireless Internet, portable Internet, a 3G mobile communication network, a 4G mobile communication network, or a 5G mobile communication network. Details of the endpoint 100 will be described below.

The security gateway 200 receives traffic from the endpoint 100 and performs data analysis related to information security of secure sockets layer (SSL) traffic among the traffic. The security gateway 200 performs a data validation procedure related to personal information and confidential information with respect to the SSL traffic among the traffic transmitted from the endpoint 100 and transmits validation result information according to the data validation procedure to the endpoint 100. A detailed operation of the security gateway 200 will be described below.

The server 300 is connected to the endpoint 100, receives traffic transmitted from the endpoint 100, and transmits traffic generated by the server 300 to the endpoint 100.

Figure 2:
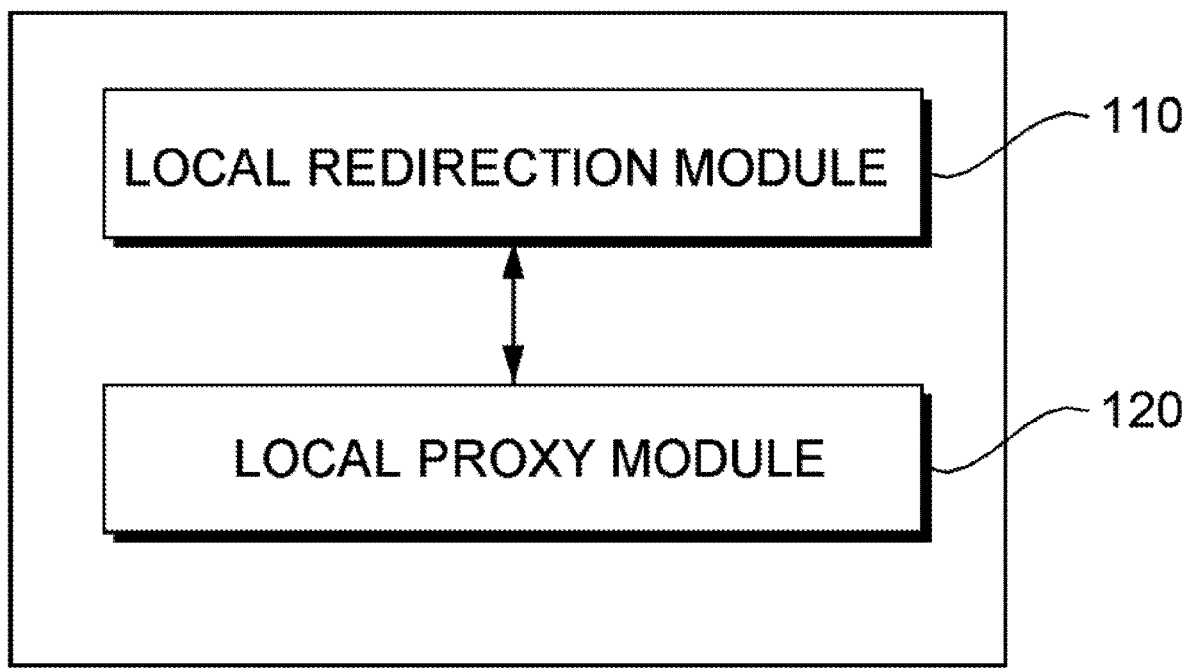
FIG. 2 is a detailed configuration block diagram illustrating the endpoint shown in FIG. 1.

FIG. 2 is a detailed configuration block diagram illustrating the endpoint 100 shown in FIG. 1.

Referring to FIG. 2, the endpoint 100 includes a local redirection module 110 and a local proxy module 120.

The local redirection module 110 performs redirection for transmitting traffic generated by an application to the server 300.

When traffic (for example, a mail, message, file, and the like) to be transmitted to the server 300 is generated according to running of the application, the local redirection module 110 stores redirection information including server connection information of the corresponding server 300 for transmitting the generated traffic in a memory (not shown).

For example, in response to a connection request with respect to the corresponding server 300 according to the traffic being generated by the application, the local redirection module 110 stores redirection information including server connection information corresponding to server IP address information and port information with respect to the server 300 and application IP address information and port information with respect to the application in the memory.

The local redirection module 110 performs redirection with respect to the traffic generated by the application by using at least one of a network-kernel-based connection redirection method and an application-socket-connection application program interface (API) hooking method. The local redirection module 110 changes the server connection information for API connection with the server 300, that is, the server IP address information and port information into a loopback IP address information and port information serviced by the local proxy module 120 and performs redirection with respect to the traffic.

The network-kernel-based connection redirection method is a method of performing redirection with the loopback IP address information and port information serviced by the local proxy module 120 in Internet connection between the application and a network kernel such as Windows filtering platform (WFP), macOS network kernel extensions (NKE), and the like. Also, the application-socket-connection API hooking method is a method of hooking a socket connection API such as 'connect( )' of the application and redirecting to the loopback IP address information and port information serviced by the local proxy module 120 during the Internet connection of the application.

According to the redirection of the local redirection module 110, the local proxy module 120 performs data decoding with respect to SSL traffic among traffic received from the local redirection module 110 and transmits the decoded SSL traffic to the security gateway 200. Also, Non-SSL traffic among the traffic received from the local redirection module 110 is forwarded as it is to the security gateway 200 using an out-of-path method. The local proxy module 120 will be described in detail as follows.

First, the local proxy module 120 is connected to the local redirection module 110 through the redirection of the local redirection module 110. Accordingly, the local proxy module 120 refers to the redirection information stored in the local redirection module 10 and performs transmission control protocol (TCP) connection with the server 300 using server IP address information and port information extracted from the redirection information according to the reference. Here, the local proxy module 120 may forward traffic information with respect to the TCP connection with the server 300 to the security gateway 200.

Then, when redirected TCP connection is generated by the local redirection module 110, the local proxy module 120 refers to the redirection information of the local redirection module 110 for the IP information and port information of the application which is a client of the TCP connection using of 'getpeername ( ) socket API'. Also, the local proxy module 120 refers to the redirection information stored in the local redirection module 110 for IP address information and port information of a server to be connected and performs the TCP connection on the corresponding server 300.

Then, the local proxy module 120 receives traffic transmitted from the application or the server 300. Here, when an SSL ClinetHello message is received from the application, the local proxy module 120 determines connection for SSL traffic and performs an SSL handshake of the server 300 side and an SSL handshake of the client side.

After performing the SSL handshakes, the local proxy module 120 performs an interception operation with respect to the SSL traffic. That is, the local proxy module 120 receives encoded SSL traffic transmitted from the application or the server 300 and decodes the encoded SSL traffic. The local proxy module 120 forwards the decoded SSL traffic to the security gateway 200. Then, the local proxy module 120 re-encodes the decoded SSL traffic and transmits the re-encoded SSL traffic to the server 300.

Meanwhile, when traffic provided from the application is not SSL traffic, that is, when the traffic is Non-SSL traffic, the local proxy module 120 forwards the provided Non-SSL traffic as it is to the security gateway 200 and additionally transmits the Non-SSL traffic to the server 300.

Here, the local proxy module 120 may add an Ethernet header, an IP header, and a TCP header to the Non-SSL traffic or payload data of the decoded SSL traffic and forward the same to the security gateway 200 using an out-of-path method. For example, the local proxy module 120 generates TCP 3-handshake packets (SYN, SYN-ACK, and ACK) in TCP connection with respect to the server 300 by adding the Ethernet header, IP header, and TCP header, generates a TCP packet with respect to the Non-SSL traffic and the payload data of the decoded SSL traffic, and generates and forwards a TCP connection end (FIN or RST) packet to the security gateway 200 when the TCP connection is finished. Departure and destination MAC addresses of the Ethernet header may designate particular values. Departure and destination IP addresses of the IP header may designate IP addresses of the application and the server. Departure and destination port information of the TCP header designate port information of the application and the server and increase Seq/Ack information of the TCP header according to transmission and reception of the payload data.

The local proxy module 120 may include or exclude traffic which is an IP address of a particular server or a process of a particular application as a target to be forward to the security gateway 200 according to a traffic forwarding policy and may include or exclude traffic which is outbound traffic or inbound traffic.

The security gateway 200 receives TCP packet type traffic forward from the local proxy module 120 of the endpoint 100 and transfers the received TCP packet type traffic as a callback function or callback data or stores the TCP packet type traffic as a PacketCapture (PCAP)-format file. Also, the security gateway 200 analyzes protocol with respect to the received traffic and inspects the forwarded traffic such as a mail, message, file, and the like for personal information and confidential information. When it is necessary to block the corresponding traffic as a result of inspecting the forwarded traffic, the security gateway 200 transmits inspection result information including address connection information formed of the IP address and port information of the application and the server 300 to be blocked to the local proxy module 120.

Accordingly, the local proxy module 120 of the endpoint 100 checks the IP address information and port information of the application and the server 300 to be blocked from the inspection result information of the security gateway 200 and ends the connections with the corresponding application and the server 300.

Figure 3:
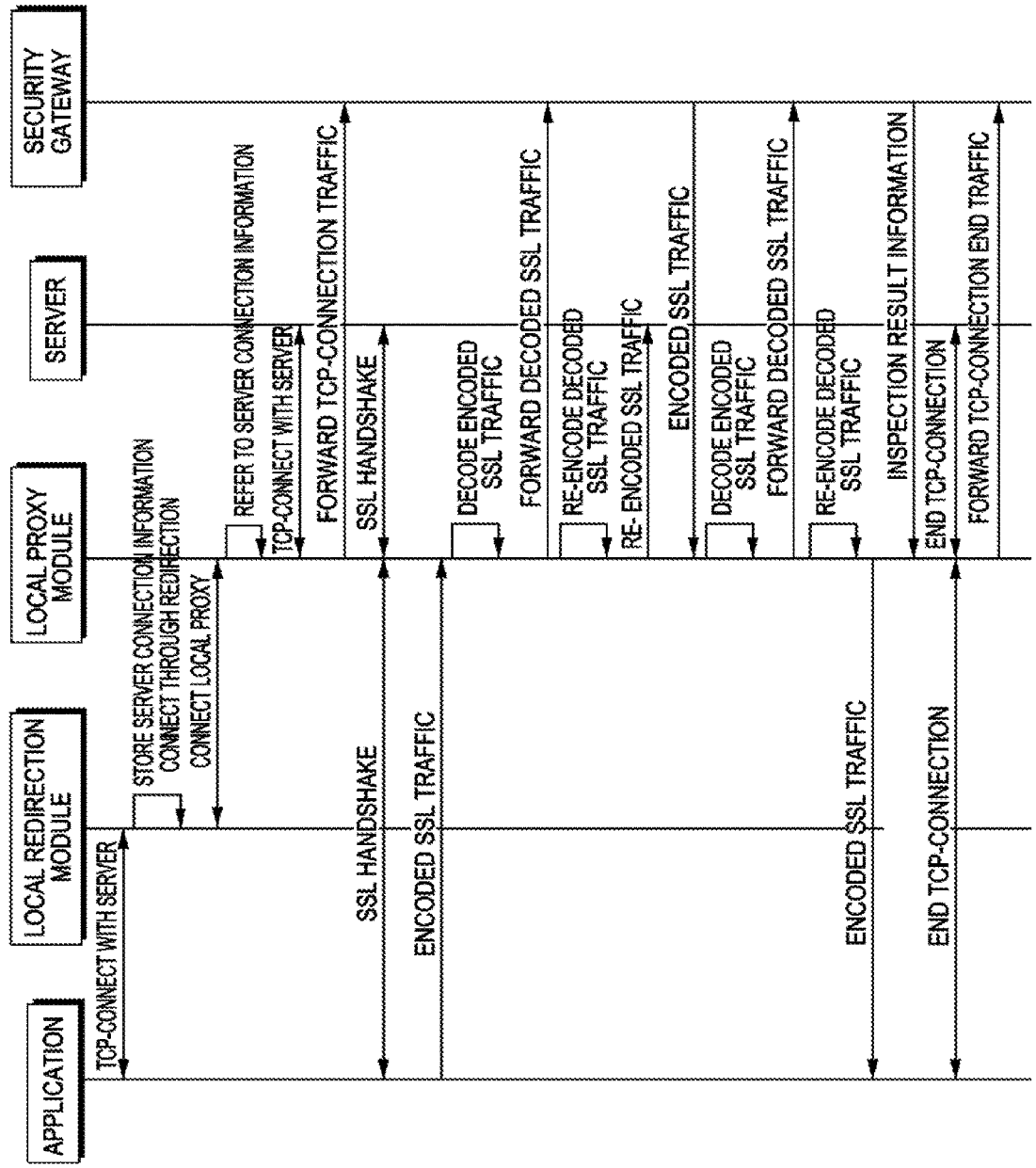
FIG. 3 is an operation-performing reference view of components which illustrates forwarding with respect to traffic by the endpoint according to the present invention.

FIG. 3 is an operation-performing reference view of components which illustrates forwarding with respect to traffic by the endpoint according to the present invention.

First, when an application provided in the endpoint 100 generates traffic to be transmitted to the server 300 and requests TCP connection from the local redirection module 110, the local redirection module 110 stores redirection information including server connection information for connection with the server 300 and performs a redirection operation for transmitting traffic to the local proxy module 120

Then, the local proxy module 120 performs TCP connection with the server 300 corresponding to the server connection information with reference to the redirection information, and here, may forward traffic information with respect to the TCP connection with respect to the server 300 to the security gateway 200. The local proxy module 120 performs an SSL handshake with each of the application and the server 300 and then receives encoded SSL traffic from the application. Next, the local proxy module 120 decodes the received encoded SSL traffic, forwards the decoded SSL traffic to the security gateway 200, and re-encodes and transmits the decoded SSL traffic to the server 300.

Then, the security gateway 200 may forward the encoded SSL traffic to the local proxy module 120 such that the local proxy module 120 may decode the encoded SSL traffic received from the security gateway 200 and then may re-encode and transmit the decoded SSL traffic to the application.

Also, the security gateway 200 may transmit inspection result information with respect to decoded SSL traffic or Non-SSL traffic forwarded from the local proxy module 120 to the local proxy module 120. Accordingly, according to the inspection result information, the local proxy module 120 ends connections with the corresponding application and server 300 forwards traffic information with respect to the end of TCP connection to the security gateway 200.

Figure 4:
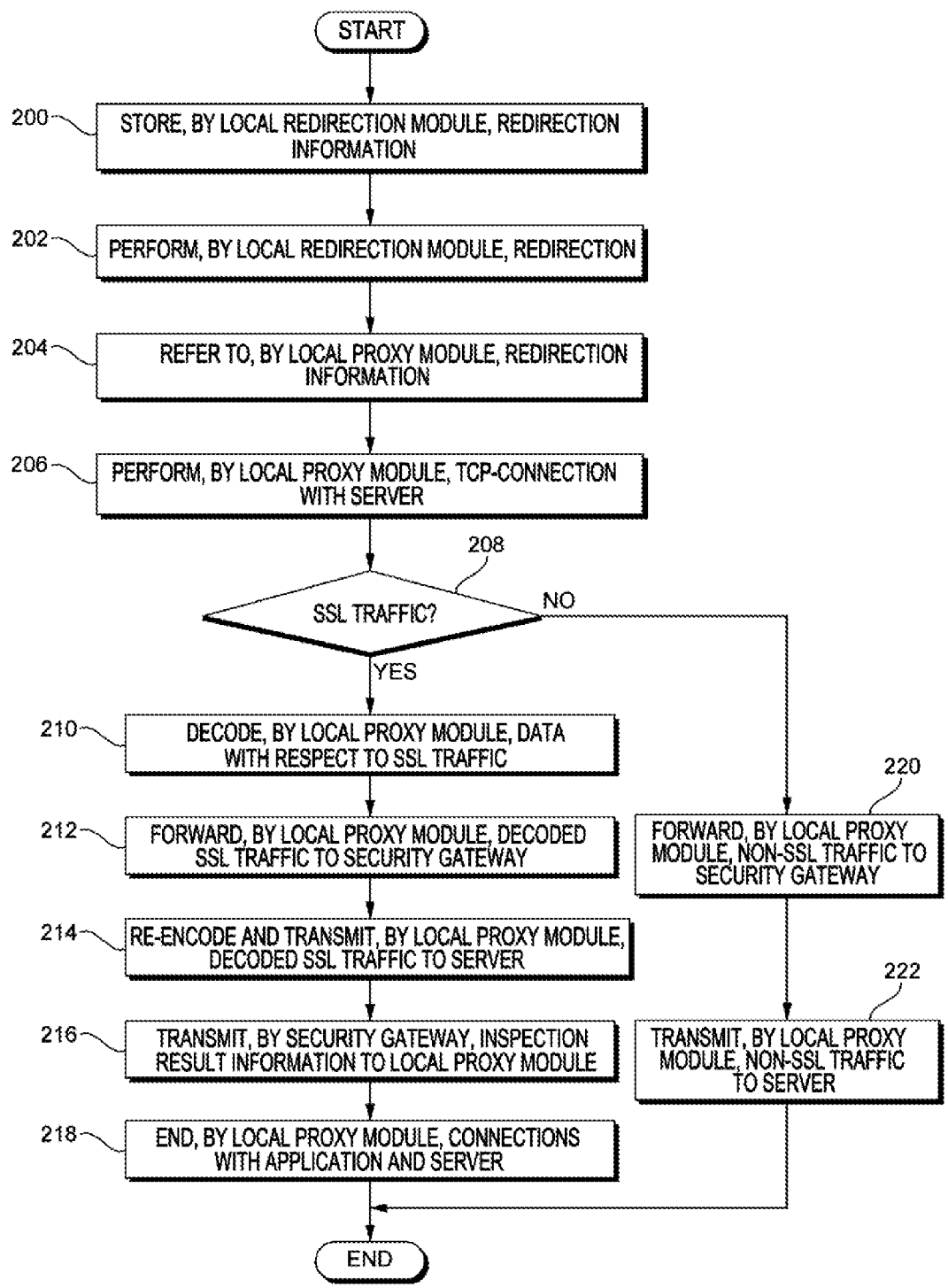
FIG. 4 is a flowchart illustrating an example of a forwarding method with respect to traffic of an endpoint according to the present invention.

FIG. 4 is a flowchart illustrating an example of a forwarding method with respect to traffic by an endpoint according to the present invention.

A local redirection module included in the endpoint stores redirection information including server connection information for transmitting traffic generated by an application to a server (200). The local redirection module stores server IP address information and port information with respect to the server and application IP address information and port information with respect to the application as the redirection information.

After operation 200, the local redirection module performs redirection related to transmission of the traffic to the server (202). The local redirection module performs the redirection with respect to the traffic by using at least one of a network-kernel-based connection redirection method and an application-socket-connection API hooking method. The local redirection module changes server connection information for API connection with the server, that is, the server IP address information and port information into a loopback IP address information and port information serviced by the local proxy module and performs redirection with respect to the traffic.

After operation 202, the local proxy module is connected to the local redirection module through the redirection of the local redirection module and refers to the redirection information stored in the local redirection module for transmission of traffic to the server (204).

After operation 204, the local proxy module performs TCP connection with the server by using the server IP address information port information extracted by reference of the redirection information (206). Then, the local proxy module receives traffic transmitted from the application or the server.

After operation 206, the local proxy module determines whether the received traffic is SSL traffic (208). When an SSL ClentHello message is received from the application, the local proxy module determines the received traffic as SSL traffic.

After operation 208, the local proxy module decodes data with respect to SSL traffic among the received traffic according to the redirection of the local redirection module (210). When it is determined that connection is for SSL traffic, the local proxy module performs an SSL handshake with a server side and an SSL handshake with a client side. After performing the SSL handshakes, the local proxy module performs an interception operation with respect to the SSL traffic. That is, the local proxy module receives and decodes encoded SSL traffic transmitted from the application or the server.

After operation 210, the local proxy module forwards the decoded SSL traffic to a security gateway (212).

After operation 212, the local proxy module re-encodes the decoded SSL traffic and transmits the re-encoded SSL traffic to the server (214).

After operation 214, the security gateway performs a data validation procedure related to personal information and confidential information on the traffic forwarded from the local proxy module and transmits inspection result information according to the data validation procedure to the local proxy module (216).

After operation 216, the local proxy module of the endpoint checks IP address information and port information of the application and the server which are targets to be blocked, from the inspection result information of the security gateway and ends connections with the corresponding application and server (218).

Meanwhile, in operation 208, when the traffic received from the application is not determined to be SSL traffic, the local proxy module adds an Ethernet header, an IP header, and a TCP header to Non-SSL traffic which is not SSL traffic and forwards the same to the security gateway (220). Here, the local proxy module may add an Ethernet header, an IP header, and a TCP header even to payload data of the decoded SSL traffic and forward the same to the security gateway.

After operation 220, the local proxy module adds an Ethernet header, an IP header, and a TCP header to Non-SSL traffic and transmits the same to the server (222).

The present invention may be implemented as a software program and be recorded in a certain computer-readable recording medium so as to be applied to a variety of reproduction devices. The variety of reproduction devices may be a personal computer (PC), a laptop PC, a mobile terminal, and the like. For example, the recording medium may be a hard disk, a flash memory, a random-accessible memory (RAM), a read-only memory (ROM), or the like as an embedded type in each reproduction device or an optical disc such as a compact disc recordable (CDR) and a compact disc rewritable, a compact flash card, smart media, a memory stick, or a multimedia card as an external medium.

According to the embodiments of the present invention, outbound traffic or inbound traffic of endpoint traffic may be selectively transmitted to and analyzed by a security gateway using an out-of-path method.

Also, in comparison to a general endpoint traffic forwarding method of transmitting and receiving an entirety of outbound and inbound traffic over the Internet while dropping by a security gateway, a cloud-based network information leakage prevention function may be provided without an excessive network delay or traffic charge.

Accordingly, without physical equipment or components in an inside network, not only inside but also outside endpoint traffic may be forward to a security gateway on a cloud to perform analysis for preventing an information leakage without an excessive network delay and network charge. Despite the information leakage prevention analysis, a network delay or traffic charge may be minimized.

Although the embodiments of the present invention have been described above, the embodiments disclosed in the specification are not intended to limit the present invention. The scope of the present invention should be interpreted through the following claims, and all equivalents thereof should be interpreted as being included within the scope of the present invention.

What is claimed is:

1. A system for forwarding traffic of an endpoint, the system comprising:
   the endpoint configured to transmit the traffic generated by an application to a server; and
   a security gateway configured to receive the traffic from the endpoint and analyze data related to information security of secure sockets layer (SSL) traffic among the traffic,
   wherein the endpoint comprises:
   a local redirection module configured to store redirection information including server connection information for transmitting the traffic to the server and to perform redirection related to transmission of the traffic, wherein the local redirection module is configured to perform the redirection with respect to the traffic by using at least one of a network-kernel-based connection redirection method and an application-socket-connection application program interface (API) hooking method; and
   a local proxy module configured to decode the data with respect to the SSL traffic among the traffic received from the local redirection module and then to forward the decoded SSL traffic to the security gateway according to the redirection of the local redirection module.

2. The system of claim 1, wherein the local redirection module stores, as the redirection information, server IP address information and port information with respect to the server and application IP address information and port information with respect to the application.

3. The system of claim 1, wherein the local proxy module is connected to the local redirection module by the redirection of the local redirection module, refers to the redirection information stored in the local redirection module, and performs transmission control protocol (TCP) connection with the server by using server IP address information and port information included in the redirection information according to the reference.

4. The system of claim 1, wherein the local proxy module re-encodes the decoded SSL traffic and transmits the re-encoded SSL traffic to the server.

5. The system of claim 4, wherein the local proxy module adds an Ethernet header, an IP header, and a TCP header to Non-SSL traffic, which is not the SSL traffic among the traffic, or payload data of the decoded SSL traffic and forwards the same to the security gateway.

6. The system of claim 1, wherein the security gateway performs a data validation procedure related to personal information and confidential information on the traffic forwarded from the local proxy module and transmits inspection result information according to the data validation procedure to the local proxy module.

7. A method of forwarding traffic of an endpoint, the method comprising:
   storing, by a local redirection module included in the endpoint, redirection information including server connection information for transmitting the traffic generated by an application to a server;
   performing, by the local redirection module, redirection related to transmission of the traffic by using at least one of a network-kernel-based connection redirection method and an application-socket-connection API hooking method;
   decoding, by a local proxy module included in the endpoint, data with respect to SSL traffic among the received traffic according to the redirection of the local redirection module; and
   forwarding, by the local proxy module, the decoded SSL traffic to a security gateway.

8. The method of claim 7, wherein the storing of the redirection information comprises storing server IP address information and port information with respect to the server and application IP address information and port information with respect to the application as the redirection information.

9. The method of claim 7, comprising:
   referring to, by the local proxy module connected to the local redirection module by the redirection of the local redirection module, the redirection information stored in the local redirection module; and
   performing, by the local proxy module, TCP connection with the server by using server IP address information and port information included in the redirection information according to the reference.

10. The method of claim 7, further comprising re-encoding, by the local proxy module, the decoded SSL traffic and transmitting, by the local proxy module, the re-encoded SSL traffic to the server.

11. The method of claim 10, further comprising adding, by the local proxy module, an Ethernet header, an IP header, and a TCP header to Non-SSL traffic, which is not the SSL traffic among the traffic, or payload data of the decoded SSL traffic and forwarding, by the local proxy module, the same to the security gateway.

12. The method of claim 10, further comprising performing, by the security gateway, a data validation procedure related to personal information and confidential information on the traffic forwarded from the local proxy module and transmitting, by the security gateway, inspection result information according to the data validation procedure to the local proxy module.

13. A system for forwarding traffic of an endpoint, the system comprising:
   the endpoint configured to transmit the traffic generated by an application to a server; and
   a security gateway configured to receive the traffic from the endpoint and analyze data related to information security of secure sockets layer (SSL) traffic among the traffic,
   wherein the endpoint comprises:
   a local redirection module configured to store redirection information including server connection information for transmitting the traffic to the server and to perform redirection related to transmission of the traffic; and
   a local proxy module configured to:
      decode the data with respect to the SSL traffic among the traffic received from the local redirection module;
      forward the decoded SSL traffic to the security gateway according to the redirection of the local redirection module;
      re-encode the decoded SSL traffic and transmit the re-encoded SSL traffic to the server; and
      add an Ethernet header, an IP header, and a TCP header to Non-SSL traffic which is not the SSL traffic among the traffic, or to payload data of the decoded SSL traffic, and forward the same to the security gateway.

* * * * *